(12) United States Patent
Yokoyama et al.

(10) Patent No.: US 7,607,295 B2
(45) Date of Patent: Oct. 27, 2009

(54) PARTICULATE ACCUMULATION AMOUNT ESTIMATING SYSTEM

(75) Inventors: Jin Yokoyama, Hino (JP); Katsuhiro Shibata, Machida (JP); Terunori Kondou, Yokohama (JP); Yoshiaki Tanaka, Machida (JP)

(73) Assignee: Nissan Motor Co., Ltd., Yokohama (JP)

( * ) Notice: Subject to any disclaimer, the term of this patent is extended or adjusted under 35 U.S.C. 154(b) by 272 days.

(21) Appl. No.: 11/480,544

(22) Filed: Jul. 5, 2006

(65) Prior Publication Data

US 2007/0006577 A1    Jan. 11, 2007

(30) Foreign Application Priority Data

Jul. 7, 2005  (JP)  ............................. 2005-198751
Jul. 8, 2005  (JP)  ............................. 2005-200675

(51) Int. Cl.
*F01N 3/00* (2006.01)
(52) U.S. Cl. ............................. 60/297; 60/274; 60/277; 60/311
(58) Field of Classification Search .................. 60/274, 60/277, 295, 297, 311; 55/DIG. 30
See application file for complete search history.

(56) References Cited

U.S. PATENT DOCUMENTS

| | | | |
|---|---|---|---|
| 5,287,698 A | | 2/1994 | Shinzawa et al. |
| 6,405,528 B1 | | 6/2002 | Christen et al. |
| 6,622,480 B2 | * | 9/2003 | Tashiro et al. .................. 60/295 |
| 6,854,265 B2 | * | 2/2005 | Saito et al. ..................... 60/295 |
| 6,928,809 B2 | * | 8/2005 | Inoue et al. .................... 60/297 |
| 7,147,693 B2 | * | 12/2006 | Inoue et al. .................... 95/273 |
| 7,155,900 B2 | * | 1/2007 | Colignon ..................... 60/297 |
| 7,264,642 B2 | * | 9/2007 | Hamahata et al. .......... 55/282.3 |
| 2006/0191258 A1 | * | 8/2006 | Opris .......................... 60/297 |

FOREIGN PATENT DOCUMENTS

| | | |
|---|---|---|
| EP | 1 081 347 A1 | 3/2001 |
| EP | 1 229 223 A1 | 8/2002 |
| EP | 1 460 245 A1 | 9/2004 |
| JP | H05-231131 A | 9/1993 |
| JP | 2002-242660 A | 8/2002 |
| JP | 2003-83036 A | 3/2003 |
| JP | 2004-211650 | 7/2004 |
| WO | WO 03/100227 A1 | 12/2003 |

\* cited by examiner

*Primary Examiner*—Tu M Nguyen
(74) *Attorney, Agent, or Firm*—Global IP Counselors, LLP (57) ABSTRACT

A particulate accumulation amount estimating system is configured to accurately estimate an amount of particulate matter accumulated in a particulate filter based on the pressure difference across the particulate filter even when ash is accumulated in the particulate filter. The particulate accumulation amount estimating system is configured to estimate a particulate accumulation amount of particulate matter accumulated in the particulate filter based on a pressure difference that was detected across the particulate filter and an effective area change of the particulate filter that was detected due to the accumulation of ash in the particulate filter. The estimate of the particulate accumulation amount based on the pressure difference across the filter will be lower as the estimate value of the ash accumulation amount becomes larger.

11 Claims, 8 Drawing Sheets

PARTICULATE ACCUMULATION AMOUNT ESTIMATING SYSTEM

CROSS-REFERENCE TO RELATED APPLICATIONS

This application claims priority under 35 U.S.C. § 119 to Japanese Patent Application Nos. 2005-198751 and 2005-200675. The entire disclosures of Japanese Patent Application Nos. 2005-198751 and 2005-200675 are hereby incorporated herein by reference.

BACKGROUND OF THE INVENTION

1. Field of the Invention

The present invention generally relates to a particulate accumulation amount estimating system; More particularly, the present invention relates to a technology for estimating the amount of particulate matter accumulated in particulate filters, which are mainly used for after-processing the exhaust gas of diesel engines.

2. Background Information

Conventionally, the particulate matter (also called "particulates") contained in the exhaust gas discharged from a diesel engine is captured using a particulate trapping device such as a diesel particulate filter. Basically, a diesel particulate filter has a honeycomb monolith made of ceramic or the like that is generally used for removing particulate matters emitted from a diesel engine. During operation of the engine, the particulate is accumulated on the diesel particulate filter increasingly. At some time when the accumulated amount of particulate exceeds an allowable amount, the diesel particulate filter becomes clogged and the exhaust pressure rises. This situation adversely affects the operating performance of the engine. For this reason, the accumulated particulate is burnt periodically so as to prevent clogging of the particulate filter.

Although the particulate matter accumulated in the particulate filter is periodically burned to prevent the filter from becoming clogged, there are components (hereinafter called "ash") of the particulate matter that cannot be burned when the particulate filter is regenerated and thus remain in the particulate filter.

Japanese Laid-Open Patent Publication No. 2004-211650 (corresponding to U.S. Pat. No. 6,928,809) discloses a system that estimates the amount of accumulated ash based on the distance the vehicle has traveled, estimates the amount of accumulated particulate matter based on the pressure difference across the particulate filter, and subtracts the estimated ash accumulation amount from the estimated particulate accumulation amount to obtain a final particulate accumulation amount. This publication also discloses that the accumulated ash amount can be determined based on both the pressure difference and exhaust flow rate at the timing of regeneration completion. However, this publication is silent on how the accumulated ash is held within the filter passage.

In view of the above, it will be apparent to those skilled in the art from this disclosure that there exists a need for an improved particulate accumulation amount estimating system. This invention addresses this need in the art as well as other needs, which will become apparent to those skilled in the art from this disclosure.

SUMMARY OF THE INVENTION

It has been discovered that in the above mentioned conventional technology assumes that the pressure loss resulting from accumulated ash occurs in the same manner as the pressure loss resulting from accumulated particulate matter and estimates the particulate accumulation amount by subtracting an ash accumulation amount estimated based on the traveled distance from an accumulation amount estimated based on the pressure difference across the particulate filter.

However, the manner in which accumulated ash is distributed with respect to the particulate filter is different from the manner in which other particulate matter is distributed. More specifically, particulate matter accumulates on substantially the entire filter (both inside the wall and on the wall surface) while as accumulates mainly in the downstream closed end of the particulate filter. Consequently, the accumulation of ash causes the effective area of the particulate filter to decrease.

The conventional system cannot take into account the decrease in the effective area of the filter caused by the accumulation of ash. Consequently, the larger the amount of accumulated ash becomes, the larger the error in the estimate of the particulate accumulation amount becomes.

When the estimate of the amount of accumulated particulate matter (particulate accumulation amount) is inaccurate, the particulate filter cannot be regenerated at an appropriate timing and such problems as excessive accumulation of particulate matter in the filter and decreased fuel performance resulting from unnecessary regeneration of the filter occur.

Therefore, it is necessary to estimate the particulate accumulation amount based on the pressure difference across the particulate filter while taking into account the decrease in the effective area of the particulate filter resulting from the accumulation of ash. However, depending on the operating conditions, there are cases in which ash accumulates inside the filter wall and the estimate of the particulate accumulation amount will incur error if the effective area of the particulate filter is determined based on an assumption that the ash accumulates solely in the downstream closed end of the particulate filter.

The present invention was conceived in view of these problems and one object of the present invention is to provide a particulate accumulation amount estimating system that can accurately estimate the amount of particulate matter accumulated in a particulate filter based on the pressure difference across the particulate filter even when ash is accumulated in the particulate filter.

In order to achieve the aforementioned object and other objects, a particulate accumulation amount estimating system is provided that basically comprises a pressure difference detecting section, an ash accumulation amount estimating section, an effective area determining section and a particulate accumulation amount estimating section. The pressure difference detecting section is configured to detect a pressure difference across a particulate filter that is configured and arranged to capture particulate matter contained in exhaust gas discharged from an engine. The ash accumulation amount estimating section is configured to estimate an ash accumulation amount of ash accumulated in the particulate filter. The effective area determining section is configured to determine a change in an effective area of the particulate filter resulting from the ash accumulated in the particulate filter based on the estimate value of the ash accumulation amount. The particulate accumulation amount estimating section is configured to estimate a particulate accumulation amount of particulate matter accumulated in the particulate filter based on the pressure difference that was detected and the effective area change that was detected.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
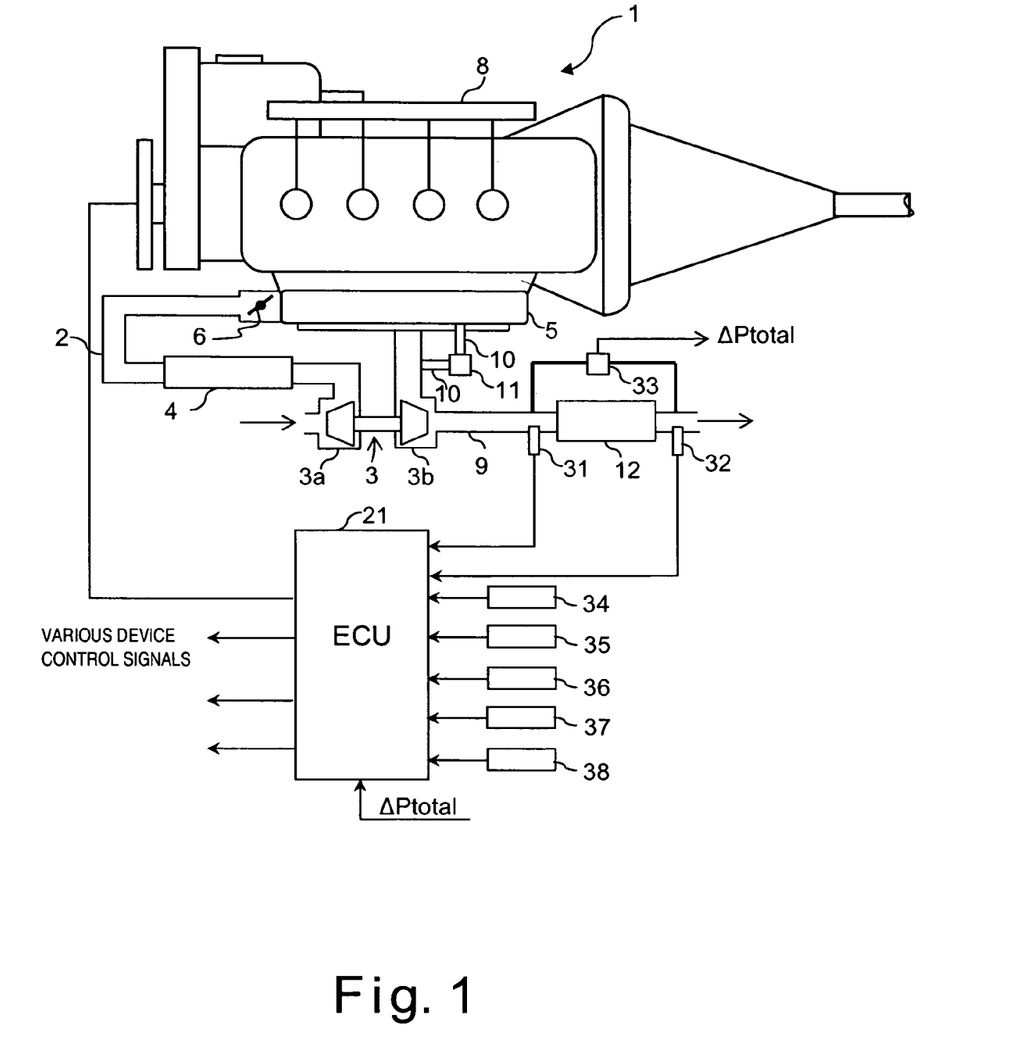
FIG. 1 is a schematic view of a diesel engine equipped with a controller having a particulate accumulation amount estimating system in accordance with each embodiment of the present invention.

Referring initially to FIG. 1, a direct injection diesel engine 1 is schematically illustrated in accordance with a first embodiment of the present invention. The diesel engine 1 is preferable used in an automobile. The diesel engine 1 is well known in the art. Since diesel engines are well known in the art, the precise structure of the diesel engine 1 will not be discussed or illustrated in detail herein. Basically, the diesel engine 1 includes an intake passage 2 that has an air cleaner (not shown) installed at an inlet portion to remove dust and particles contained in the intake air. A variable nozzle turbocharger 3 is operatively coupled to diesel engine 1. In particular, the turbocharger 3 includes a compressor part 3a installed in the air intake passage 2 at a point downstream of the air cleaner, and a turbine part 3b installed in an exhaust passage 9. The intake air that has passed through the air cleaner is compressed by the compressor part 3a and fed onward to an intercooler 4. The intercooler 4 is installed downstream of the compressor part 3a such that the intake air discharged from the compressor part 3a is cooled by the intercooler 4. A throttle valve 6 is installed immediately upstream of a surge tank 5. Thus, the cooled intake air from the intercooler 4 passes through the throttle valve 6 and into the surge tank 5 before being distributed to the individual cylinders at a manifold section of the diesel engine 1.

Regarding the main body of the engine 1, the diesel engine 1 includes a cylinder head with a plurality of fuel injectors 7. The fuel injectors 7 are fixed to the main body of the engine 1 in such a manner as to be positioned in the approximate middle or center of an upper portion of the combustion chamber of each of the cylinders.

The fuel delivery system of the diesel engine 1 includes a common rail 8. Fuel pumped by a fuel pump (not shown) is delivered to the injectors 7 through the common rail 8 in a conventional manner. The fuel injectors 7 are configured to operate in response to a fuel injection signal sent from an electronic control unit or "ECU" 21. The fuel injectors 7 are configured and arranged to execute fuel injections in several stages. In particular, the fuel injections are divided into a main injection for controlling the torque of the engine 1, a pilot injection for reducing the generation of particulates, and a post injection for increasing the exhaust gas temperature during regeneration of a particulate filter 12 (described later). The pilot injection is executed at a more advanced timing than the main injection and the post injection is executed at a more retarded timing than the main injection.

Meanwhile, the turbine part 3b of the turbocharger 3 is installed downstream of the manifold section in the exhaust passage 9. The turbine part 3b of the turbocharger 3 has movable vanes in which the vane angles of the movable vanes are controlled in accordance with the operating conditions by a supercharging pressure control signal from the electronic control unit 21.

The diesel particulate filter 12 is installed downstream of the turbine part 3b in order to perform after-processing of the exhaust gas. The particulates in the exhaust gas are removed from the exhaust gas as the exhaust gas passes through the diesel particulate filter 12. An exhaust gas recirculation (EGR) pipe 10 is connected between the exhaust passage 9 and the air intake passage 2 (i.e., the surge tank 5 in this embodiment) for recirculating exhaust gas (EGR). An exhaust gas recirculation (EGR) control valve 11 is installed in the exhaust gas recirculation pipe 10. The exhaust gas recirculation control valve 11 operates in response to an exhaust gas recirculation control signal from the electronic control unit 21. An appropriate amount of exhaust gas is recirculated to the intake passage 2 by adjusting the opening degree of the exhaust gas recirculation control valve 11.

The exhaust gas cleaning device of the diesel engine 1 in this embodiment includes the diesel particulate filter 12 and the regenerating device, which comprises the electronic control unit 21 and a plurality of sensors (e.g., an inlet temperature sensor 31, an outlet temperature sensor 32, a pressure difference sensor 33, an air flow meter 34, a crankshaft position sensor 35, an accelerator position sensor 36, a vehicle speed sensor 37 and an exhaust pressure sensor 38) as discussed below. The diesel particulate filter 12 has a honeycomb monolith made of ceramic or the like. The basic structure of the diesel particulate filter 12 is well known in the art. Since diesel particulate filters are well known in the art, the precise structure of the diesel particulate filter 12 will not be discussed or illustrated in detail herein.

The electronic control unit 21 preferably includes a microcomputer with a regenerative particulate filter control program that controls the fuel injectors as discussed below. The electronic control unit 21 can also include other conventional components such as an input interface circuit, an output interface circuit, and storage devices such as a ROM (Read Only Memory) device and a RAM (Random Access Memory) device. The microcomputer of the electronic control unit 21 is programmed to control the regeneration of the particulate filter 12. The memory circuit stores processing results and control programs are run by the processor circuit. The electronic control unit 21 is operatively coupled to the sensors 31-38 in a conventional manner. The internal RAM of the electronic control unit 21 stores statuses of operational flags and various control data. The internal ROM of the electronic control unit 21 stores various operations as needed and/or desired. It will be apparent to those skilled in the art from this disclosure that the precise structure and algorithms for electronic control unit 21 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The sensors 31-38 of the regenerating device send signals to the electronic control unit 21 for the purpose of regenerating the diesel particulate filter 12. The exhaust gas temperature sensors 31 and 32 are configured and arranged to detect the exhaust gas temperatures Texhin and Texhout at the inlet and outlet, respectively, of the diesel particulate filter 12. The exhaust gas temperature sensor 31 is configured and arranged to produce a signal indicative of the exhaust gas temperature Texhin at the inlet of the diesel particulate filter 12 that is sent to the electronic control unit 21. The exhaust gas temperature sensor 32 is configured and arranged to produce a signal indicative of the exhaust gas temperature Texhout at the outlet of the diesel particulate filter 12 that is sent to the electronic control unit 21.

The filter pressure difference sensor 33 constitutes a pressure difference detecting section that is configured and arranged to detect the filter pressure difference ΔPtotal across the diesel particulate filter 12. The filter pressure difference sensor 33 is configured to produce a signal indicative of the filter pressure difference that is sent to the electronic control unit 21.

The air flow meter 34 is configured and arranged to detect air flow of in the air intake passage 2. The air flow meter 34 is configured to produce a signal indicative of the intake air flow rate of the air intake passage 2 that is sent to the electronic control unit 21.

The crank angle sensor 35 is configured and arranged to detect the crank angle of the crankshaft of the diesel engine 1. The crank angle sensor 35 is configured to produce a signal indicative of the crank angle that is sent to the electronic control unit 21.

The accelerator position sensor 36 is configured and arranged to detect the depression amount of the accelerator pedal of a vehicle driven by the diesel engine 1. The accelerator position sensor 36 is configured to produce a signal indicative of the depression amount of the accelerator pedal that is sent to the electronic control unit 21.

The vehicle speed sensor 37 is configured and arranged to detect the vehicle speed. The vehicle speed sensor 37 is configured to produce a signal indicative of the vehicle speed that is sent to the electronic control unit 21.

The exhaust pressure sensor 38 is configured and arranged to detect the exhaust gas pressure Pexh in the vicinity of the temperature sensor 31. The exhaust pressure sensor 38 is configured to produce a signal indicative of the e exhaust gas pressure Pexh that is sent to the electronic control unit 21.

The electronic control unit 21 is configured to estimate the amount of particulate matter accumulated in the particulate filter 12 (particulate accumulation amount) based on the aforementioned signals and determines if it is necessary to regenerate the particulate filter 12 based on the result of the estimate. If electronic control unit 21 determines that regeneration is necessary, then the electronic control unit 21 executes a filter regeneration control when the vehicle is operating with a prescribed operating condition or a prescribed set of operating conditions under which regeneration is permitted. The filter regeneration control serves to raise the exhaust gas temperature and burn the particulate matter accumulated in the particulate filter 12.

By controlling one or more of the operations of the fuel injectors 7, the turbocharger 3, the exhaust gas recirculation control valve 11, and the intake air throttle valve 6, the electronic control unit 21 can raise the exhaust gas temperature during regeneration control to burn the particulate matter accumulated in the particulate filter 12. More specifically, at least one of the following quantities is adjusted during regeneration control in order to raise the exhaust gas temperature and combust the particulates accumulated in the particulate filter 12: the main injection timing of the injectors 7, the injection timing and injection quantity of the post injection, the vane angle of the turbocharger 3, the opening degree of the exhaust gas recirculation control valve 11, and the opening degree of the intake air throttle valve.

Basically, the electronic control unit 21 of the present invention is configured to estimate the amount of ash accumulated in the particulate filter 12 based on the distance traveled by vehicle in which the particulate filter is installed and to use the estimate value of the amount of accumulated ash to find a pressure loss rate k corresponding to the decrease in the effective area of the particulate filter 12 resulting from the accumulation of ash and to find a partial pressure difference $\Delta P_{ASH}$ across the particulate filter 12 resulting from the accumulated ash. The partial pressure difference $\Delta P_{PM}$ resulting from the accumulation of particulate matter is then found using the following equation:

$\Delta P_{PM} = \Delta Ptotal/k - \Delta P_{ASH}$, where ΔPtotal is a detected value of the total pressure difference across the particulate filter.

Since an accumulation of ash causes the effective area of the particulate filter 12 to decrease, the decrease in the effective area of the particulate filter 12 resulting from the accumulation of ash is determined based on an estimate value of the ash accumulation amount and the amount of accumulated particulate matter is estimated based on the pressure difference across the particulate filter under the conditions of a reduced effective area. Thus, the particulate accumulation amount can be estimated in accordance with the decrease in the effective area of the particulate filter resulting from the accumulation of ash and the particulate accumulation amount can be estimated accurately even if the ash accumulation amount increases. In other words, by accurately estimating the amount of accumulated ash that is causing the effective area of the particulate filter 12 to decrease, the accuracy of the estimation of the amount of particulate matter accumulated in the particulate filter 12 is increased.

The control processing executed by the electronic control unit 21 in connection with regeneration of the particulate filter 12 will now be explained with reference to the flowchart shown in FIG. 2. This computational processing is executed at each specific predetermined interval.

In step S1, the electronic control unit 21 determines if the value of a regeneration flag F is 0. The electronic control unit 21 proceeds to step S2 if the value of the regeneration flag F is 0 and to step S5 if the value of the regeneration flag is not 0 (i.e., the regeneration flag F is 1). The regeneration flag F is set to 0 when the engine 1 is started and is set to 1 when the particulate filter 12 needs to be regenerated.

In step S2, the electronic control unit 21 estimates the particulate accumulation amount PM, which is the amount of particulate matter that has accumulated in the particulate filter 12. The estimation of the particulate accumulation amount PM is executed according to the flowchart shown in FIG. 5 (explained later).

In step S3, the electronic control unit 21 determines if the particulate accumulation amount PM is equal to or larger than a prescribed amount PM1. If the particulate accumulation amount PM is equal to or larger than the prescribed amount PM1, then the electronic control unit 21 proceeds to step S4. If the particulate accumulation amount PM is smaller than the prescribed amount PM1, then the electronic control unit 21 returns to step S1 and repeats the control routine.

The prescribed amount PM1 is a value that is set in advance and corresponds to a maximum allowable amount of accumulated particulate matter.

In step S4, the electronic control unit 21 sets regeneration flag F to 1.

In step S5, the electronic control unit 21 determines if vehicle is operating with a prescribed regeneration permission condition or a prescribed set of regeneration permission conditions under which execution of regeneration control is permitted. If the regeneration permission condition is satisfied, then the electronic control unit 21 proceeds to step S6. The regeneration permission condition is a predetermined operating condition or set of predetermined operating conditions based on such factors as the vehicle speed and the engine load.

In step S6, the electronic control unit 21 executes a filter regeneration control contrived to raise the temperature of the exhaust gas and thereby combust the particulates accumulated in the particulate filter 12.

In step S7, the electronic control unit 21 determines if the regeneration of the particulate filter 12 has been completed. The determination as to whether or not the regeneration has been completed can be made based on whether or not the amount of accumulated particulate matter still remaining in the particulate filter 12 has fallen to or below a prescribed amount due to the execution of the regeneration control. The particulate accumulation amount PM estimated according to the flowchart shown in FIG. 5 (described later) can be used as the amount of particulate matter remaining in the particulate filter 12.

It is also possible to determine if the regeneration has been completed by determining the total amount of particulate matter that has been combusted by the regeneration control. The total amount of combusted particulate matter can be determined using a particulate combustion rate $\Delta$PM (amount of particulate matter combusted per unit time) estimated based on the exhaust gas flow rate Qexh and the temperature Tdpf of the particulate filter 12.

If the electronic control unit 21 determines that the regeneration has been completed, then the electronic control unit 21 proceeds to step S8 where it sets the value of the regeneration flag F to 0. The electronic control unit 21 then ends the regeneration control sequence.

After the electronic control unit 21 executes control to regenerate the particulate filter 12 and determines that the regeneration has been completed (step S7), the electronic control unit 21 then estimates an ash accumulation amount ASH, which is the amount of accumulated ash in the particulate filter 12. The ash accumulation amount ASH is determined by the electronic control unit 21 executing the process of the flowchart (ash accumulation amount estimating section) shown in FIG. 3.

The term "ash" refers to matter that remains in the particulate filter 12 after the particulates have been combusted, and is composed mainly of unburnable components contained in the particulate matter. Examples of these unburnable components include calcium sulfate, particles generated by friction between sliding parts inside the engine 1, and particles of rust from the exhaust manifold and turbine housing.

Figure 3:
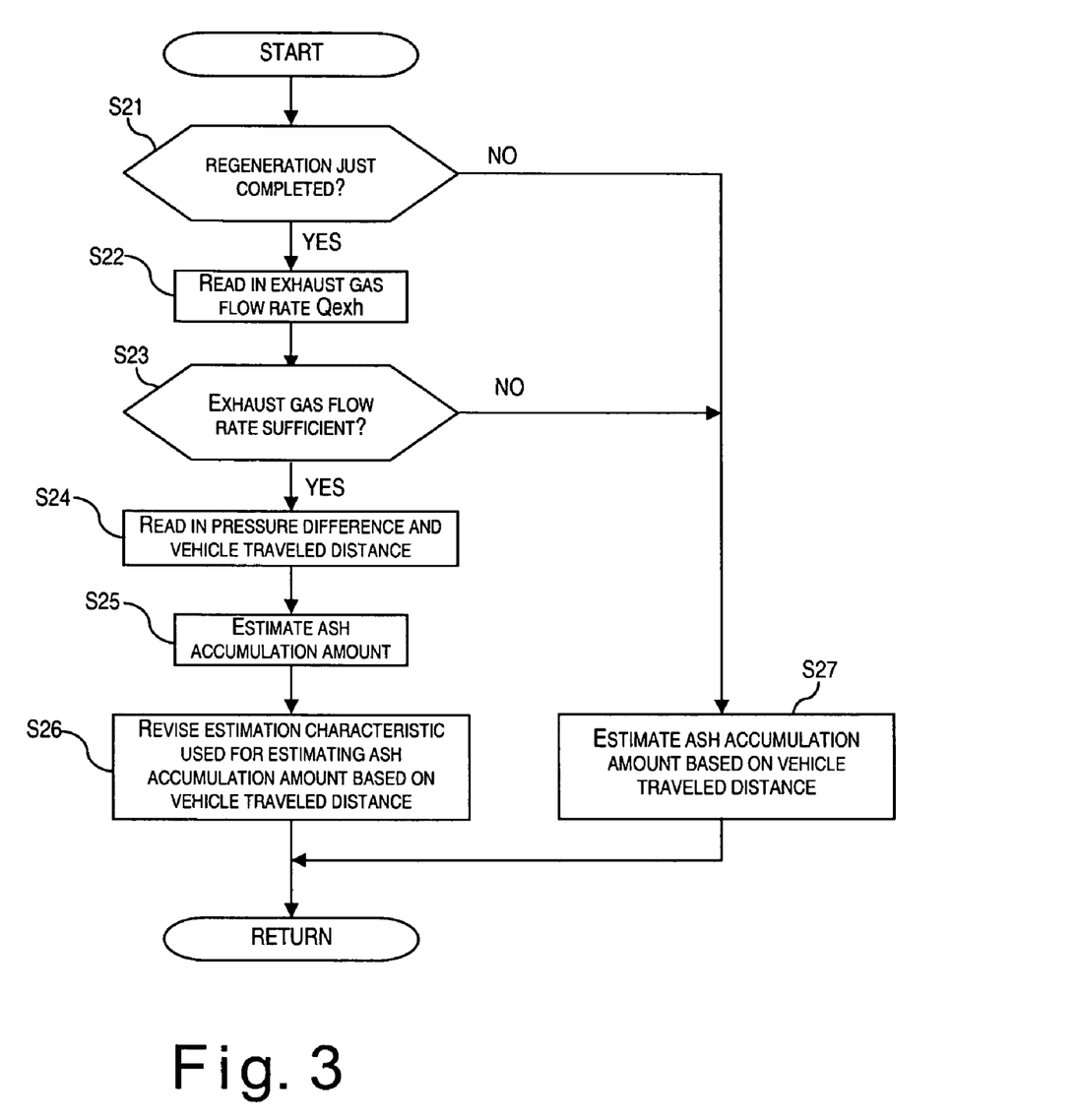
FIG. 3 is a flowchart illustrating an ash accumulation amount estimation routine executed by the particulate accumulation amount estimating system in accordance with the first embodiment of the present invention.

Immediately after the particulate filter 12 has been regenerated, the amount of accumulated particulate matter is very small and the pressure difference across the particulate filter 12 can be used as an indicator of the amount of accumulated ash.

In step S21 of the flowchart shown in FIG. 3, the electronic control unit 21 determines if a regeneration of the particulate filter 12 has just been completed (i.e., if the current point in time exists immediately after the completion of a regeneration).

If a regeneration has just been completed, the electronic control unit 21 proceeds to step S22. If not, the electronic control unit 21 proceeds to step S27. The determination as to whether or not a regeneration of the particulate filter 12 has just been completed is made by determining if the regeneration flag F is currently set to 0 and if an amount of time elapsed or a prescribed distance traveled is below a prescribed value since the value of the regeneration flag F last changed from 1 to 0.

In step S22, the electronic control unit 21 reads in the exhaust gas flow rate Qexh.

In step S23, the electronic control unit 21 determines if the exhaust gas flow rate Qexh is at or above a prescribed flow rate. The determination of step S23 serves to check if conditions suitable for measuring the pressure difference across the particulate filter 12 exist. If the exhaust gas flow rate Qexh is at or above the prescribed flow rate, the electronic control unit 21 proceeds to step S24. If the exhaust gas flow rate Qexh is below the prescribed flow rate, the electronic control unit 21 proceeds to step S27 where an ash accumulated amount is estimated based on a vehicle traveled distance D. The vehicle traveled distance D is the distance traveled since the vehicle left the factory or since the particulate filter 12 was last changed (replaced). The traveled distance D is calculated based on a consecutive sampling of the vehicle speed VSP and a prescribed vehicle speed sampling time period $\Delta t$ (i.e., $D = \Sigma(VSP \times \Delta t)$).

In step S24, the electronic control unit 21 reads in the pressure difference $\Delta$Ptotal across the particulate filter 12 and the vehicle traveled distance D.

In step S25, the electronic control unit 21 estimates the ash accumulation amount ASH based on the pressure difference $\Delta$Ptotal and the exhaust gas flow rate Qexh. The estimate of the ash accumulation amount ASH is accomplished using a map (FIG. 4) that is configured to allocate the ash accumulation amount ASH in accordance with the pressure difference $\Delta$Ptotal and the exhaust flow rate Qexh. The map characteristic used to obtain the ash accumulation amount ASH is configured such that the value of the ash accumulation amount ASH increases as the pressure difference ΔPtotal increases for any given fixed exhaust gas flow rate Qexh. The map is based on the assumption that the ash only accumulates in the downstream closed end of the particulate filter 12 and the assumption that the amount of accumulated ash corresponds directly to the amount by which the effective area of the particulate filter 12 has decreased.

In order to more accurately estimate the ash accumulation amount ASH, the ash accumulation amount ASH read from the map is amended based on the exhaust gas temperature Texhin at the inlet of the particulate filter 12 and the exhaust gas pressure Pexh at the inlet of the particulate filter 12.

In step S26, the electronic control unit 21 executes a learning compensation control whereby the rate at which the ash accumulation amount ASH is assumed to increase with respect to the vehicle traveled distance is revised by comparing the ash accumulation amount ASH calculated based on the traveled distance D to the ash accumulation amount ASH found in step S25. The estimated value of the ash accumulation amount ASH based on the traveled distance (vehicle travel history) carries a degree of error with respect to the actual value due to variations in the type of engine oil used and the quantity if oil consumed.

Therefore, in this embodiment, the characteristic for estimating the ash accumulation amount based on the traveled distance (vehicle travel history) is revised after each regeneration of the particulate filter using the ash accumulation amount ASH calculated based on the pressure difference ΔPtotal detected immediately after regeneration. Since the pressure difference ΔPtotal detected immediately after regeneration indicates the pressure loss (pressure difference across the filter) resulting from ash alone, the ash accumulation amount ASH calculated based on ΔPtotal can be assumed to be approximately equal to the actual value of the ash accumulation amount ASH.

The system can be configured to include a device that issues a warning to urge the driver to replace the particulate filter 12 when the amount of accumulated ash in the particulate filter 12 exceeds a reference value.

In step S27, the electronic control unit 21 determines the ash accumulation amount ASH corresponding to the current traveled distance using the correlation between the traveled distance (vehicle travel history) and the ash accumulation amount ASH, the correlation being amended consecutively using the ash accumulation amount ASH estimated based on the pressure difference ΔPtotal across the particulate filter 12 immediately after each regeneration. Alternatively, the ash accumulation amount ASH at any given time can also be estimated based on the oil consumption amount or the engine load instead of the traveled distance.

Figure 2:
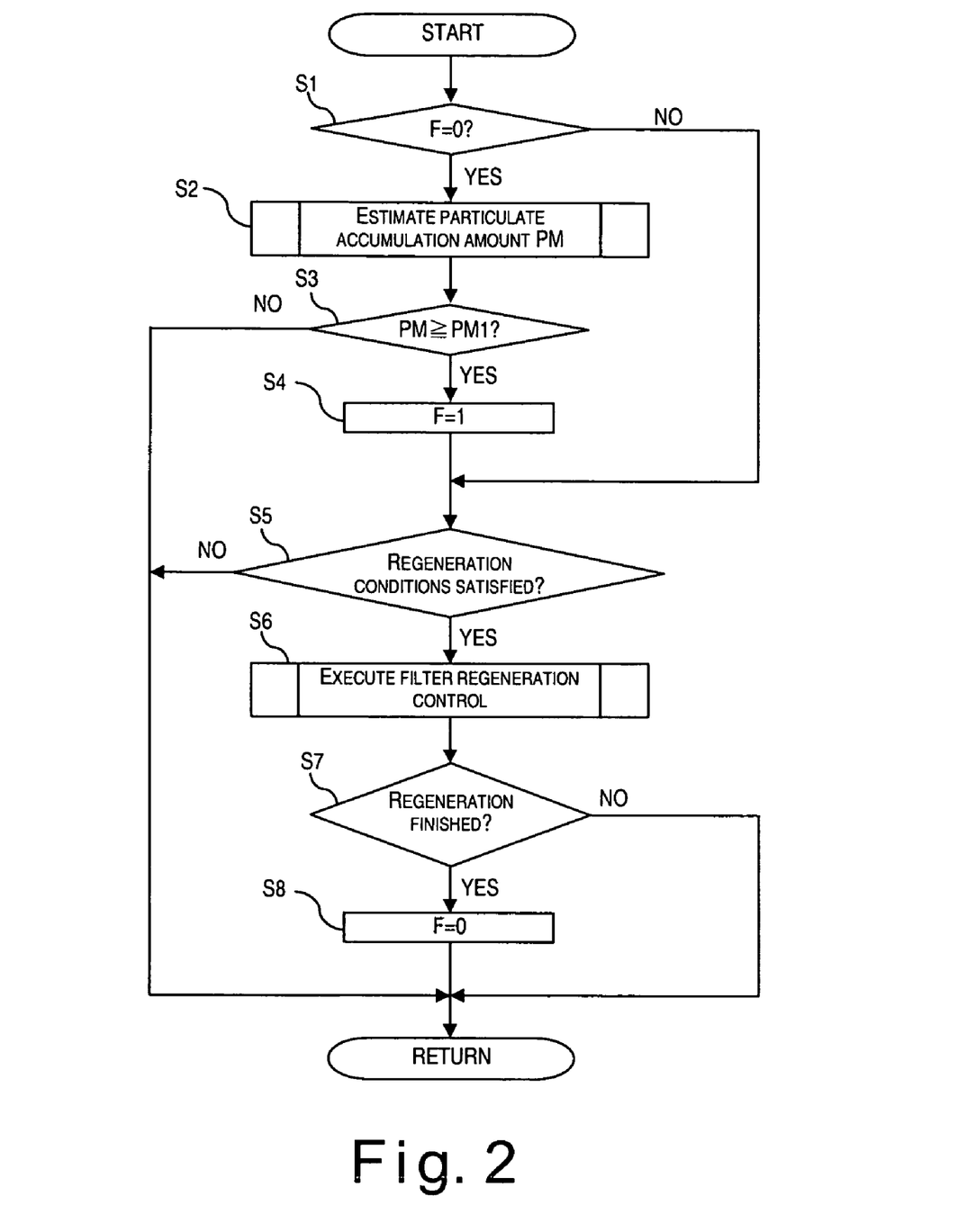
FIG. 2 is a flowchart illustrating a regeneration control routine executed by the particulate accumulation amount estimating system in accordance with the first embodiment of the present invention.
Figure 5:
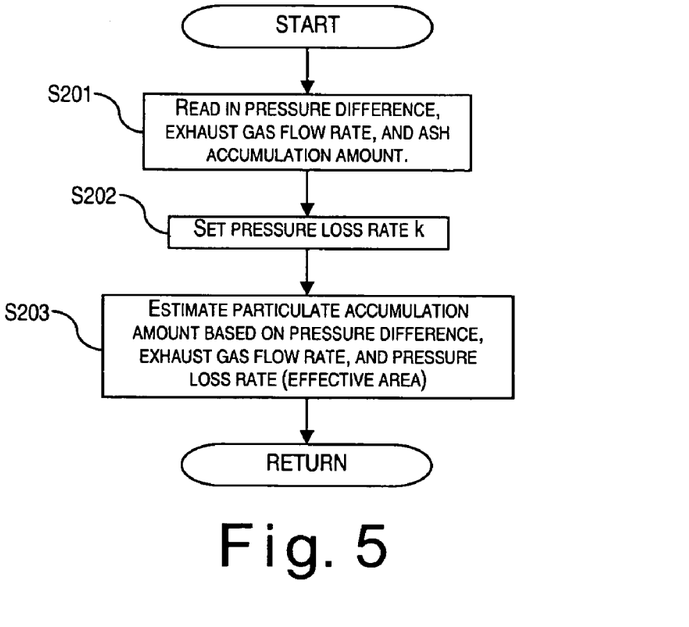
FIG. 5 is a flowchart illustrating a particulate accumulation amount estimation routine executed by the particulate accumulation amount estimating system in accordance with the first embodiment of the present invention.

FIG. 5 is a flowchart showing the details of the control processing executed in step S2 of the flowchart shown in FIG. 2.

In step S201, the electronic control unit 21 reads in the filter pressure difference ΔPtotal detected by the pressure difference sensor 33, the exhaust gas flow rate Qexh, and the ash accumulation amount ASH estimated according to the flowchart shown in FIG. 3.

In step S202, the electronic control unit 21 sets the pressure loss rate k based on the ash accumulation amount ASH. The pressure loss rate k is a variable that correlates with the change in the effective area of the particulate filter 12. Thus, the execution of the process of step S202 constitutes an effective area determining section. The ash accumulates mainly in the downstream closed end of the particulate filter 12 and the effective area of the particulate filter 12 decreases due to the accumulated ash. Thus, the ash accumulation amount corresponds approximately to the amount by which the effective area decreases.

The filter pressure difference that results with respect to the same particulate accumulation amount tends to increase as the effective area of the particulate filter 12 decreases due to the accumulation of ash. Therefore, the proportion by which the filter pressure difference increases due to the decrease in the filter effective area (caused by the accumulation of ash) is set as the pressure loss rate k. The pressure loss rate k is then used to amend the detected value of the filter pressure difference ΔPtotal. In this way, the effect of the decrease in the filter effective area resulting from the accumulation of ash is eliminated.

More specifically, the filter pressure difference ΔPtotal can be expressed with the equation ΔPtotal=k ($\Delta P_{PM}+\Delta P_{ASH}$), where $\Delta P_{PM}$ is an accumulated particulate matter portion of the pressure difference (partial pressure difference) resulting from the accumulation of particulates and $\Delta P_{ASH}$ is an accumulated ash portion of the pressure difference (partial pressure difference) resulting from the accumulation of ash. The value of the pressure loss rate k increases as the effective area decreases due to the accumulation of ash. Thus, by setting the pressure loss rate k based on the estimated value of the ash accumulation amount, the partial pressure difference $\Delta P_{PM}$ resulting from the accumulation of particulates can be found by rearranging the above equation as follows:

$$\Delta P_{PM}=\Delta P\text{total}/k-\Delta P_{ASH}.$$

Figure 6:
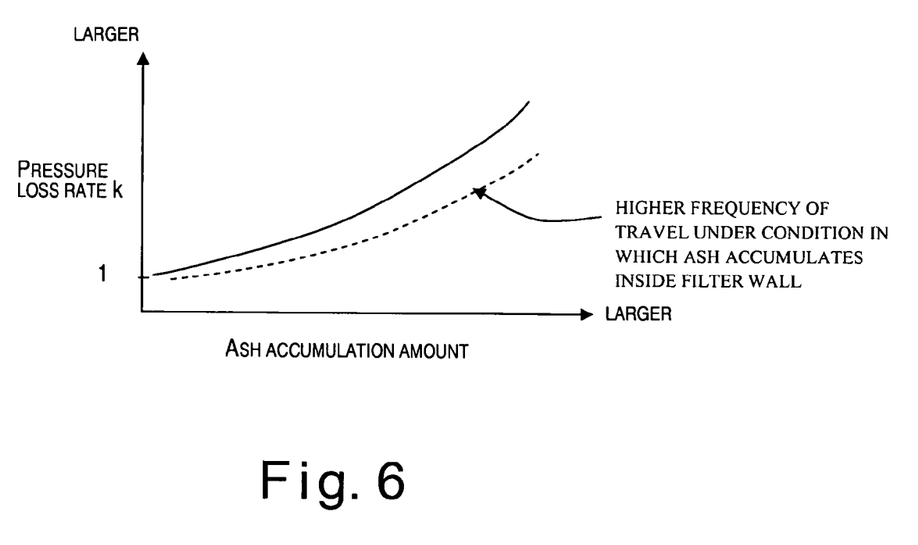
FIG. 6 is a characteristic diagram illustrating a correlation between the ash accumulation amount and the pressure loss rate k in accordance with each embodiment of the present invention.

The correlation between the ash accumulation amount (effective area of the particulate filter) and the pressure loss rate k is established in advance with a map like that shown in FIG. 6. The pressure loss rate k is read from the map based on the ash accumulation amount at that particular time.

In step S203, the electronic control unit 21 uses the pressure loss rate k set in step S202 to find the pressure difference $\Delta P_{PM}$ resulting from the accumulated particulate matter using the equation $\Delta P_{PM}=\Delta P\text{total}/k-\Delta P_{ASH}$. Then, based on the partial pressure difference $\Delta P_{PM}$, the electronic control unit 21 calculates the particulate accumulation amount. Thus, the execution of the process of step S203 constitutes a particulate accumulation amount estimating section.

Figure 4:
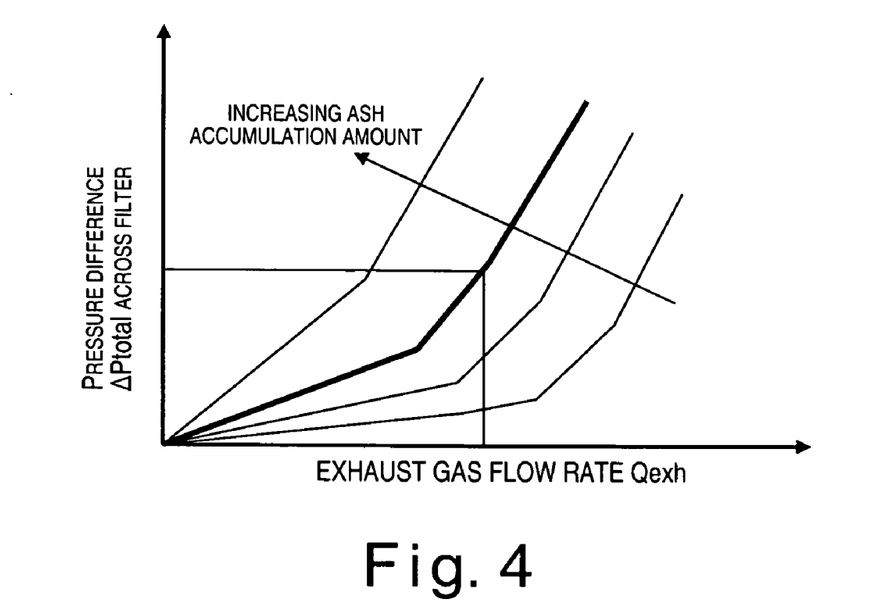
FIG. 4 is a characteristic diagram plotting the ash accumulation amount ASH versus the exhaust gas flow rate Qexh and the filter pressure difference ΔPtotal in accordance with each embodiment of the present invention.

The value ΔPtotal used in the calculation of the partial pressure difference $\Delta P_{PM}$ is the filter pressure difference ΔPtotal detected by the pressure difference sensor 33, and the value $\Delta P_{ASH}$ is found using the correlation shown in FIG. 4 based on the current exhaust gas flow rate Qexh and the ash accumulation amount estimated based on the traveled distance.

The once the partial pressure difference $\Delta P_{PM}$ is found, the particulate accumulation amount PM is found by referring to a correlation similar to that shown in FIG. 4 based on the exhaust gas flow rate Qexh and the partial pressure difference $\Delta P_{PM}$. In this way, the particulate accumulation amount can be estimated accurately even if the effective area of the particulate filter has decreased due to an accumulation of ash.

Figure 7:
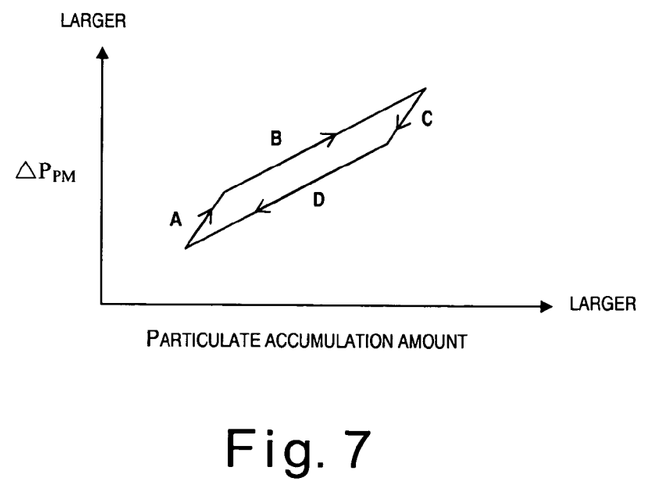
FIG. 7 is a characteristic diagram showing a correlation between the particulate accumulation amount and the filter pressure difference in accordance with each embodiment of the present invention.

However, a hysteresis characteristic like that shown in FIG. 7 exists in the relationship between the pressure difference (partial pressure difference $\Delta P_{PM}$) and the particulate accumulation amount PM. In FIG. 7, the line A indicates the pressure difference increase characteristic that occurs when particulate material accumulates inside the wall of the particulate filter 12, the line B indicates the pressure difference increase characteristic that occurs when particulate matter accumulate on the wall surface of the particulate filter 12, the line C indicates the pressure difference decrease characteristic that occurs when the particulate matter inside the wall of the particulate filter 12 is combusted, and the line D indicates the pressure difference decrease characteristic that occurs when the particulate matter on the wall surface of the particulate filter 12 is combusted. The characteristic curve followed by the value of $\Delta P_{PM}$ proceeds in order from A to B as the amount of accumulated particulate matter increases due to filtering and from C to D as the amount of accumulated particulate matter decreases due to combustion during regeneration.

As indicated in FIG. 7, the rate at which (proportion by which) the pressure difference increases with respect to an increase in the particulate accumulation amount is higher when particulate matter is accumulating inside the wall of the particulate filter than when particulate matter is accumulating on the surface of the filter wall. Similarly, the rate at which the pressure difference decreases with respect to a decrease in the particulate accumulation amount is higher when particulate matter inside the wall of the particulate filter is being combusted than when particulate matter on the surface of the filter wall is being combusted. In short, the trend along which the pressure difference increases when the amount of accumulated particulate matter is increasing is not the same as the trend along which the pressure difference decreases when the accumulated particulate matter is decreasing as a result of being combusted.

Thus, even if the particulate accumulation amount and the exhaust gas flow rate Qexh are the same, the pressure difference across the particulate filter will be different depending on whether the particulate accumulation amount is in the process of increasing or in the process of decreasing (i.e., being combusted to regenerate the particulate filter). In other words, the estimate of the particulate accumulation amount will incur error if the particulate accumulation amount is estimated in the same manner regardless of whether the particulate accumulation amount is increasing or decreasing.

Therefore, in this embodiment, a hysteresis characteristic like that shown in FIG. 7 is prepared experimentally in advance and the characteristic used to convert the partial pressure difference $\Delta P_{PM}$ into the particulate accumulation amount is changed (switched) depending on whether the particulate accumulation amount is in the process of increasing or in the process of decreasing (i.e., being combusted to regenerate the particulate filter).

As a result, with this embodiment, the particulate accumulation amount can be estimated with a high degree of accuracy both when the particulate accumulation amount is increasing and when the particulate amount is decreasing due to regeneration of the particulate filter.

Figure 8:
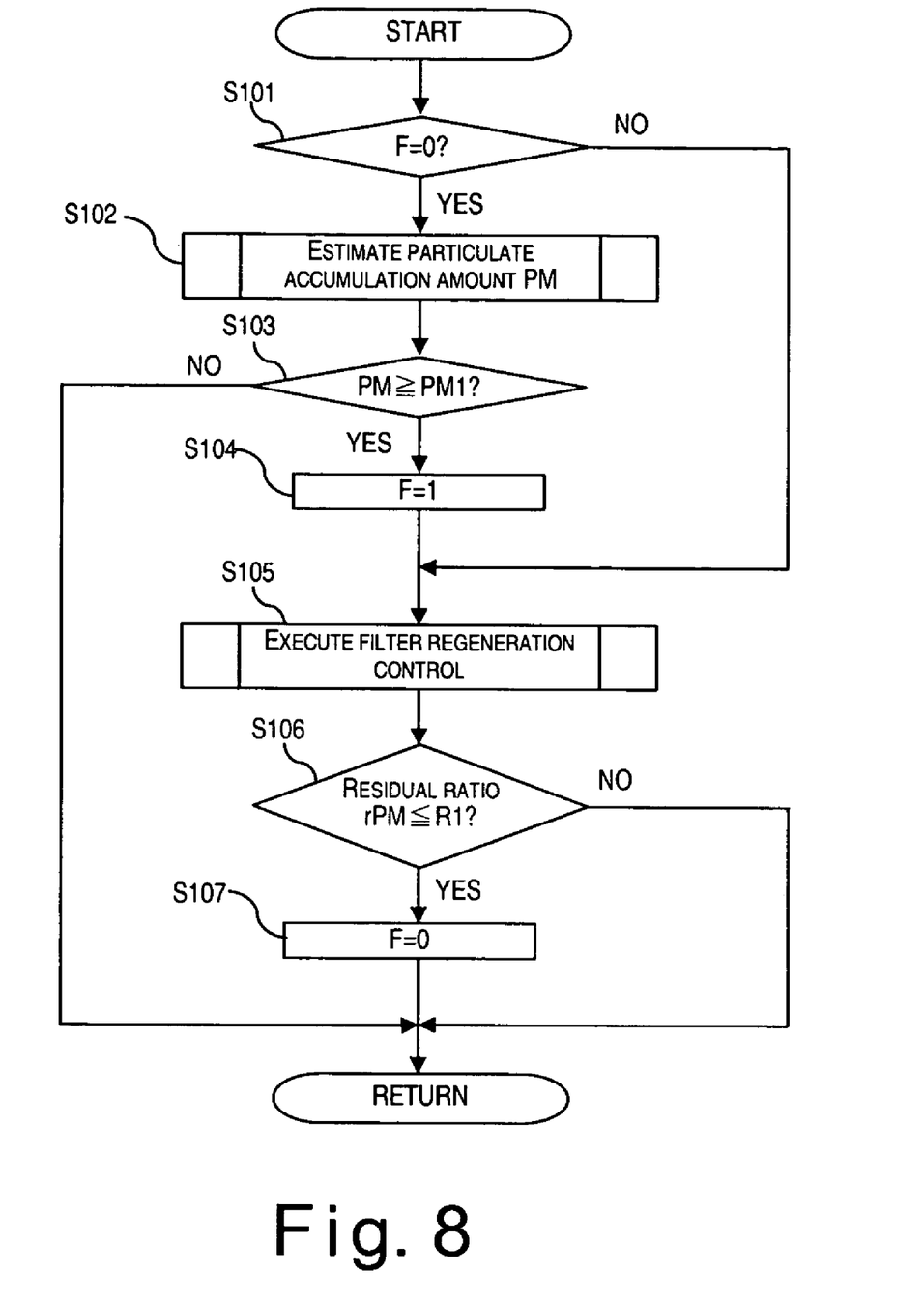
FIG. 8 is a flowchart illustrating a regeneration control routine executed by the particulate accumulation amount estimating system in accordance with a second embodiment of the present invention.
Figure 9:
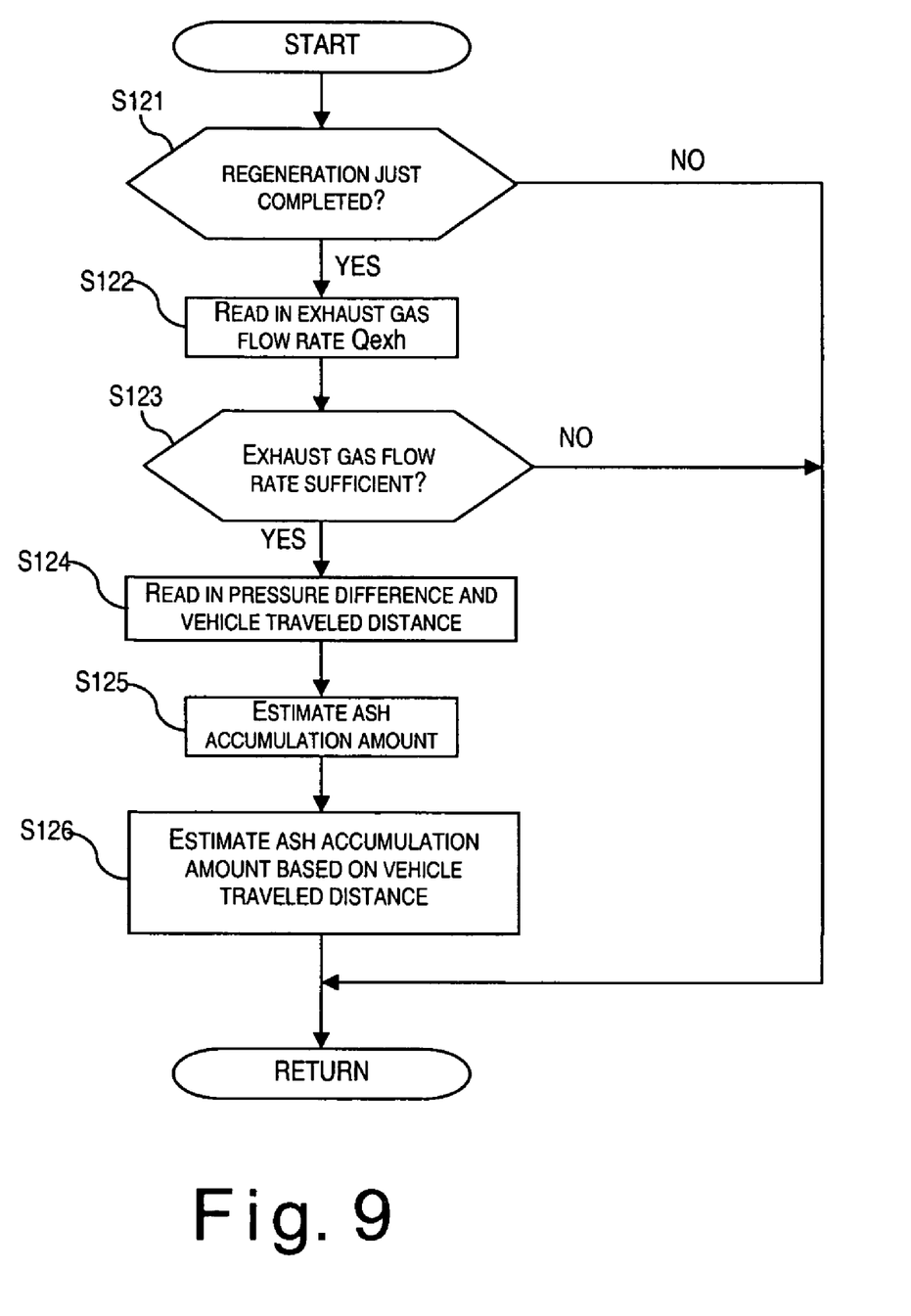
FIG. 9 is a flowchart illustrating an ash accumulation amount estimation routine executed by the particulate accumulation amount estimating system in accordance with the second embodiment of the present invention.
Figure 10:
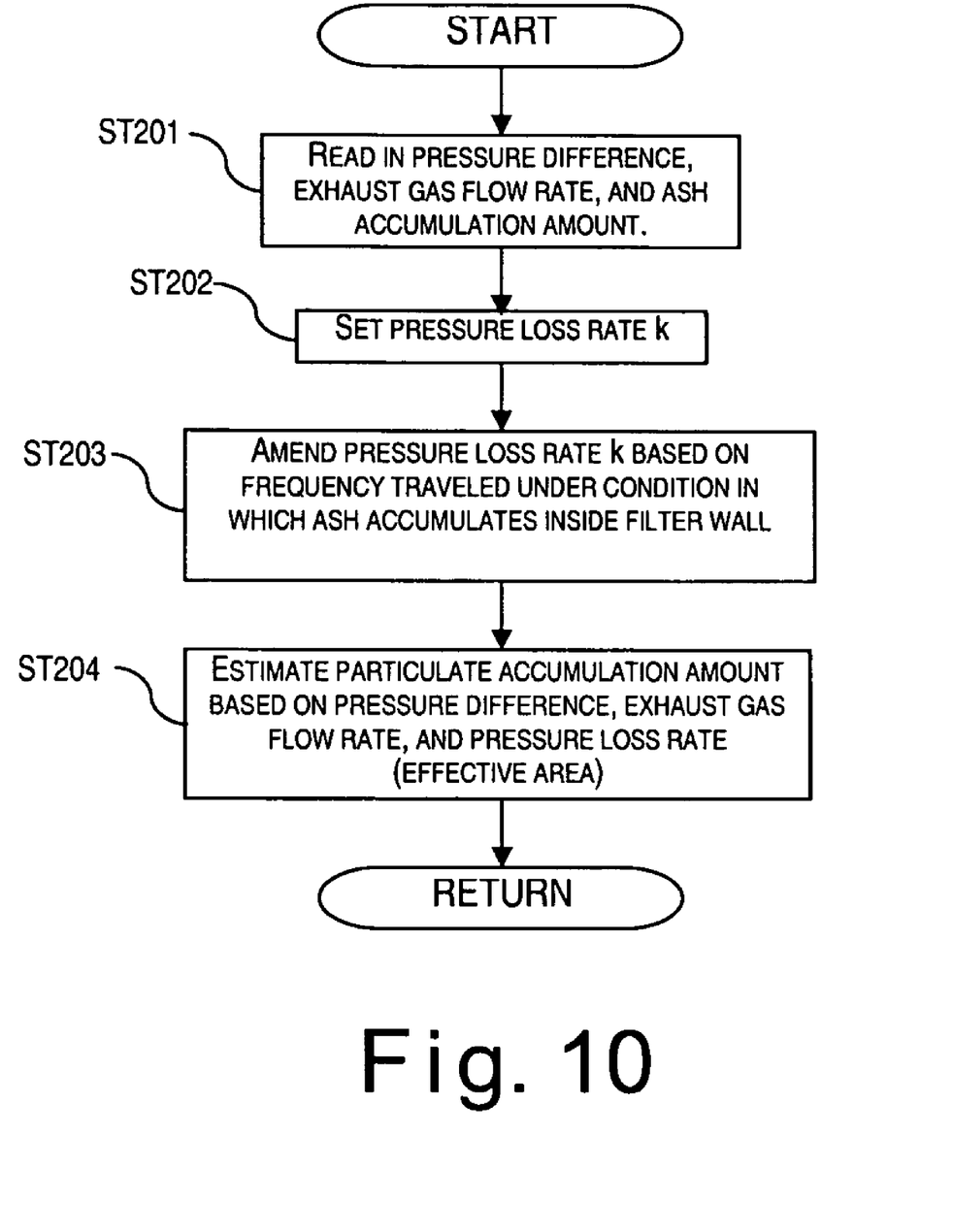
FIG. 10 is a flowchart illustrating a particulate accumulation amount estimation routine executed by the particulate accumulation amount estimating system in accordance with the second embodiment of the present invention.

Referring now to FIGS. 8 to 10, alternate control operations that are executed by the electronic control unit 21 of FIG. 1 will now be explained in accordance with a second embodiment of the present invention. With this second embodiment of the present invention, a pressure loss rate k based on an estimate value of the amount of ash accumulated in the particulate filter 12 similar to the first embodiment. This pressure loss rate k indicates the proportion by which the pressure difference across the particulate filter 12 has increased due to the decrease in the effective area of the particulate filter 12 resulting from the accumulation of ash. However, in this second embodiment of the present invention, the pressure loss rate k is then amended based on the frequency with which the vehicle in which the system is employed has traveled under a condition(s) in which ash accumulates inside a wall of the particulate filter 12. This amendment results in a pressure loss rate k that more accurately reflects the actual decrease in the effective area of the particulate filter 12. Finally, the particulate accumulation amount is estimated based on the pressure difference across the particulate filter 12, the exhaust gas flow rate, and the pressure loss rate k (effective area). When the particulate accumulation amount reaches a prescribed amount, the system executes a regeneration control whereby the particulate filter is regenerated.

First, the control operations executed by the electronic control unit 21 in connection with regeneration of the particulate filter 12 will be explained with reference to the flowchart shown in FIG. 8.

Basically, the control operations of steps S101 to S104 in the flowchart shown in FIG. 8 are the same as the control operations of steps S1 to S4 in the flowchart shown in FIG. 2, except the control processing executed in step S102 of the flowchart shown in FIG. 8 is executed in accordance with a flowchart shown FIG. 10. Thus, the descriptions of the control operations of steps S101 to S104 in the flowchart shown in FIG. 8 will be omitted for the sake of brevity.

In the control operations in the flowchart shown in FIG. 8, step S5 of the first embodiment has been omitted and the processing proceeds directly step 104 (corresponds to step S4) to step S105 (corresponds to step S6). In step S105, the electronic control unit 21 executes a regeneration control so as to raise the temperature of the exhaust gas and burn the accumulated particulate matter. During the regeneration control, a particulate combustion rate $\Delta PM$ (amount of particulate matter combusted per unit time) is estimated based on the exhaust gas flow rate Qexh and the temperature Tdpf of the particulate filter 12 and used to calculate a particulate remainder rate rPM.

In step S106, the electronic control unit 21 determines if the particulate remainder rate rPM has decreased to a prescribed value R1. When the remainder rate rPM decreases to the prescribed value R1, the electronic control unit 21 proceeds to step S107 where it sets the regeneration flag F to 0 and ends the regeneration control.

After the electronic control unit 21 executes control to regenerate the particulate filter 12 and determines that the regeneration has been completed (step S1106), the electronic control unit 21 estimates the amount ASH of accumulated ash in the particulate filter 12 (ash accumulation amount ASH) by following the flowchart shown in FIG. 9.

In step S121 of the flowchart shown in FIG. 9, the electronic control unit 21 determines if a regeneration of the particulate filter 12 has just been completed (i.e., if the current point in time exists immediately after the completion of a regeneration).

If a regeneration has just been completed, the electronic control unit 21 proceeds to step S122. If not, the electronic control unit 21 returns to the beginning of the control routine. The determination as to whether or not a regeneration of the particulate filter 12 has just been completed is made by determining if the regeneration flag F is currently set to 0 and if the amount of time elapsed or the distance traveled since the value of the regeneration flag F last changed from 1 to 0 is below a prescribed value.

In step S122, the electronic control unit 21 reads in the exhaust gas flow rate Qexh.

In step S123, the electronic control unit 21 determines if the exhaust gas flow rate Qexh is at or above a prescribed flow rate. The determination of step S123 serves to check if the exhaust gas flow rate Qexh is at a suitable value for measuring the pressure difference across the particulate filter 12. If the exhaust gas flow rate Qexh is at or above the prescribed flow rate, the electronic control unit 21 proceeds to step S124. If the exhaust gas flow rate Qexh is below the prescribed flow rate, the electronic control unit 21 returns to the beginning of the control routine.

In step S124, the electronic control unit 21 reads in the pressure difference ΔPtotal across the particulate filter 12 and the traveled distance D. As mentioned above in the first embodiment, the vehicle traveled distance D is the distance traveled since the vehicle left the factory or since the particulate filter 12 was last changed (replaced). Thus, the traveled distance D is calculated based on a consecutive sampling of the vehicle speed VSP and a prescribed vehicle speed sampling time period Δt (i.e., D=Σ(VSP×Δt)).

In step S125, the electronic control unit 21 estimates the ash accumulation amount ASH based on the pressure difference ΔPtotal and the exhaust gas flow rate Qexh. The estimate of the ash accumulation amount ASH is accomplished using a map (e.g., FIG. 4) that is configured to allocate an ash accumulation amount ASH in accordance with the pressure difference ΔPtotal and the exhaust flow rate Qexh. The map characteristic used to obtain the ash accumulation amount ASH is configured such that the value of the ash accumulation amount ASH increases as the pressure difference ΔPtotal increases for any given fixed exhaust gas flow rate Qexh. The map is based on the assumption that the ash only accumulates in the downstream closed end of the particulate filter 12 and the assumption that the amount of accumulated ash corresponds directly to the amount by which the effective area of the particulate filter 12 has decreased.

In order to more accurately estimate the ash accumulation amount ASH, the ash accumulation amount ASH read from the map is amended based on the exhaust gas temperature Texhin at the inlet of the particulate filter 12 and the exhaust gas pressure Pexh at the inlet of the particulate filter 12.

In step S126, the electronic control unit 21 executes a setting operation whereby the rate at which the ash accumulation amount ASH is assumed to increase with respect to the traveled distance is revised by comparing the ash accumulation amount ASH calculated based on the traveled distance D to the ash accumulation amount ASH found in step S125. The estimate value of the ash accumulation amount ASH based on the traveled distance (vehicle travel history) carries a degree of error with respect to the actual value due to variations in the type of engine oil used and the quantity if oil consumed.

Therefore, in this embodiment, the characteristic for estimating the ash accumulation amount ASH based on the traveled distance (vehicle travel history) is revised so as to achieve an estimate result that is closer to the actual ash accumulation amount ASH. The revision is based on the ash accumulation amount ASH calculated based on the pressure difference ΔPtotal across the particulate filter 12. Since the pressure difference ΔPtotal detected immediately after regeneration indicates the pressure loss (pressure difference across the filter) resulting from ash alone, the ash accumulation amount ASH calculated based on ΔPtotal can be assumed to be approximately equal to the actual value of the ash accumulation amount ASH. Alternatively, the ash accumulation amount ASH can also be estimated based on the oil consumption amount or the engine load instead of the traveled distance.

The system can be configured to include a device that issues a warning to urge the driver to replace the particulate filter 12 when the amount of accumulated ash in the particulate filter 12 exceeds a reference value.

FIG. 10 is a flowchart showing the details of the control processing executed in step S102 of the flowchart shown in FIG. 8.

In step ST201, the electronic control unit 21 reads in the pressure difference ΔPtotal across the particulate filter 12, the exhaust gas flow rate Qexh, and the ash accumulation amount ASH estimated according to the flowchart shown in FIG. 9.

The ash accumulation amount ASH mentioned here is a value obtained by integrating based on the traveled distance and is revised based on the pressure difference across the particulate filter 12 at a time when regeneration of the particulate filter 12 has just been completed.

In step ST202, the electronic control unit 21 sets a pressure loss rate k based on the ash accumulation amount ASH. The pressure loss rate k is a variable that correlates with the change in the effective area of the particulate filter 12. Thus, the execution of the process of step ST202 constitutes an effective area determining section. The ash accumulates mainly in the downstream closed end of the particulate filter 12 and the effective area of the particulate filter 12 decreases due to the accumulated ash. Thus, the ash accumulation amount corresponds approximately to the amount by which the effective area decreases.

The filter pressure difference that results with respect to the same particulate accumulation amount tends to increase as the effective area of the particulate filter 12 decreases due to the accumulation of ash. Therefore, the proportion by which the filter pressure difference increases due to the decrease in the filter effective area (caused by the accumulation of ash) is set as the pressure loss rate k. The pressure loss rate k is then used to amend the detected value of the filter pressure difference ΔPtotal. In this way, the detected filter pressure difference can be converted to a value corresponding to the pressure loss that would result from the same particulate accumulation amount if the particulate filter had its original volume.

In other words, when the particulate accumulation amount is estimated based on the filter pressure difference, the effect of ash accumulation is recognized as a decrease in the effective area of the particulate filter 12 and the particulate accumulation amount is estimated based on the assumption that the pressure loss that exists with respect to the decreased effective area that remains after the amount of accumulated ash is taken into account is due to the accumulation of particulate matter.

The correlation between the effective area of the particulate filter and the pressure loss rate k is established in advance with a map like that shown in FIG. 6. The pressure loss rate k is read from the map based on the current effective area of the particulate filter, where the effective area is revised from an initial effective area value based on the ash accumulation amount at that particular point in time.

In step ST203, the ECU 12 amends the pressure loss rate k based on the ratio of the distance traveled under a condition(s) in which ash accumulates inside a wall of the particulate filter 12 to the total distance traveled up to that point in time (i.e., based on the frequency with which the vehicle has traveled under a condition in which ash accumulates inside a wall of the particulate filter).

In step ST202, the pressure loss rate k is set based on the assumption that the entire amount of accumulated ash contributes to decreasing the effective area. However, when all of the conditions (1) to (3) listed below are satisfied, ash will also accumulate inside the wall of the particulate filter 12, but this accumulated ash inside the wall of the particulate filter 12 does not reduce the effective area. In other words, there is a time in which ash will not be deposited in the particulate filter 12 to affect diminishing the filter capacity.

(1) Particulate matter is not accumulated in the particulate filter 12 (i.e., the accumulation amount is below a prescribed amount, e.g. 0.5 g/liter).

(2) The temperature of the particulate filter 12 is at or above a prescribed temperature, e.g. 500° C.

(3) The exhaust gas temperature is at or above a prescribed temperature, e.g. 500° C.

It is also acceptable to configure the system such that the vehicle is assumed to be traveling under conditions in which ash accumulates inside a wall of the particulate filter 12 when at least one of the aforementioned conditions (1), (2), and (3) is satisfied.

In step ST203, the electronic control unit 21 revises the pressure loss rate k in such a fashion that the larger the ratio of the distance traveled under conditions in which ash accumulates inside a wall of the particulate filter 12 to the total distance traveled is, i.e., the larger the ratio of ash accumulated inside a wall of the particulate filter 12 to the total ash accumulation amount is, the smaller the pressure loss rate k becomes.

In other words, although the ash accumulation amount converts directly into the amount of decrease in the effective area of the particulate filter 12 when all of the ash accumulates in the downstream closed end of the particulate filter 12, ash also accumulates inside the wall of the particulate filter 12 when all of the conditions (1) to (3) are satisfied. The ash that accumulates inside the filter wall does not contribute to decreasing the effective area. Therefore, this time period is preferably removed from estimation of the accumulated ash, by modifying the pressure loss factor k. More precisely, in step ST203, the pressure loss factor k is multiplied by a wall deposit occurrence coefficient (i.e., 1—(time period in which ash will not be deposited after the regeneration/total time elapsed after the regeneration)).

Therefore, the pressure loss rate k is revised in such a fashion as to ignore the amount of ash accumulated inside the wall of the particulate filter 12 and reflect the actual decrease in the effective area resulting from ash accumulated in the downstream closed end of the particulate filter 12.

Substantially the same result can be obtained by amending the ash accumulation amount used to find the effective area or amending the effective area found based on the ash accumulation amount instead of amending the pressure loss rate k. In either case, the amendment can still be based on the ratio of the distance traveled under conditions in which ash accumulates inside a wall of the particulate filter 12 to the total distance traveled (i.e., the frequency at which the vehicle traveled under a condition(s) in which ash accumulates inside a wall of the particulate filter 12).

Instead of amending the pressure loss rate k based on the traveled distance, it is also feasible to amend the pressure loss rate k based on the ratio of the amount of oil consumed under a condition(s) in which ash accumulates inside a wall of the particulate filter 12 to the total amount of oil consumed or the ratio of the portion of an integration value of the engine load calculated under a condition(s) in which ash accumulates inside a wall of the particulate filter 12 to the total integration value of the engine load.

In step ST204, the electronic control unit 21 estimates the particulate accumulation amount PM based on the filter pressure difference ΔPtotal, the exhaust gas flow rate Qexh, and the pressure loss rate k (effective area of particulate filter 12) revised based on the frequency of travel under a condition(s) in which ash accumulates inside a wall of the particulate filter 12. Thus, the execution of the process of step ST204 constitutes a particulate accumulation amount estimating section of this embodiment.

In this way, by finding the change in the pressure loss rate resulting from the decrease in the effective area of the particulate filter caused by ash accumulation and estimating the particulate accumulation amount PM based on the pressure difference ΔPtotal at the decreased filter effective area, the particulate accumulation amount PM can be estimated with good accuracy even when the effective area of the particulate filter has decreased greatly due to the accumulation of ash.

Additionally, since the pressure loss rate k is revised based on the ratio of the distance traveled under conditions in which ash accumulates inside a wall of the particulate filter 12 to the total distance traveled (i.e., the frequency with which the vehicle travels under a condition(s) in which ash accumulates inside a wall of the particulate filter 12), the actual effective area of the particulate filter 12 can be estimated accurately and the accuracy of the estimate of the particulate accumulation amount can be improved.

There are cases in which a hysteresis characteristic exists in the correlation between the pressure difference and the particulate accumulation amount. In other words, the correlation is somewhat different depending on whether the amount of particulate matter accumulated in the particulate filter 12 is increasing or decreasing.

Therefore, it is preferable to change (switch) the characteristic used to estimate the particulate accumulation amount depending on whether the particulate accumulation amount is in the process of increasing or in the process of decreasing.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A particulate accumulation amount estimating method comprising:
   detecting a pressure difference across a particulate filter that is configured and arranged to capture particulate matter contained in exhaust gas discharged from an engine;
   estimating an ash accumulation amount of ash accumulated in the particulate filter;
   determining a change in an effective area of the particulate filter resulting from the ash accumulated in the particulate filter based on the estimated value of the ash accumulation amount;
   determining a pressure loss rate corresponding to a change in the effective area;
   determining an accumulated ash portion of the pressure difference that was detected due to the accumulated ash based on the estimated value of the ash accumulation amount;
   estimating a particulate accumulation amount of particulate matter accumulated in the particulate filter based on an amended pressure difference and the effective area change that was determined, the amended pressure difference resulting from amending the pressure difference based on the pressure loss rate; and
   calculating an accumulated particulate matter portion of the detected pressure difference due to the accumulated particulate matter by subtracting the accumulated ash portion of the detected pressure difference resulting from the accumulated ash from the amended pressure difference.

2. A particulate accumulation amount estimating system comprising:
   a pressure difference detecting section configured to detect a pressure difference across a particulate filter that is configured and arranged to capture particulate matter contained in exhaust gas discharged from an engine;
   an ash accumulation amount estimating section configured to estimate an ash accumulation amount of ash accumulated in the particulate filter;
   an effective area determining section configured to determine
      a change in an effective area of the particulate filter resulting from the ash accumulated in the particulate filter based on the estimated value of the ash accumulation amount,
      a pressure loss rate corresponding to a change in the effective area, and
      an accumulated ach portion of the pressure difference that was detected due to the accumulated ash based on the estimated value of the ash accumulation amount; and
   a particulate accumulation amount estimating section configured to
      estimate a particulate accumulation amount of particulate matter accumulated in the particulate filter based on an amended pressure difference and the effective area change that was determined, the amended pressure difference resulting from amending the pressure difference based on the pressure loss rate, and
      calculate an accumulated particulate matter portion of the detected pressure difference due to the accumulated particulate matter by subtracting the accumulated ash portion of the detected pressure difference resulting from the accumulated ash from the amended pressure difference.

3. The particulate accumulation amount estimating system as recited in claim 2, wherein
   the particulate accumulation amount estimating section is further configured to estimate the particulate accumulation amount based on the pressure difference across the filter such that the estimate of the particulate matter accumulated in the particulate filter will be lower as the estimated value of the ash accumulation amount becomes larger.

4. The particulate accumulation amount estimating system as recited in claim 2, wherein
   the ash accumulation amount estimating section is further configured to estimate the ash accumulation amount based on a vehicle traveled distance.

5. The particulate accumulation amount estimating system as recited in claim 2, wherein
   the ash accumulation amount estimating section is further configured to estimate the ash accumulation amount based on the pressure difference detected across the particulate filter at a point in time immediately after the particulate filter is regenerated.

6. The particulate accumulation amount estimating system as recited in claim 2, wherein
   the ash accumulation amount estimating section is further configured to amend the estimated value of the ash accumulation amount based on a detected frequency with which the particulate filter has been subjected to a vehicle traveling condition in which ash accumulates inside a wall of the particulate filter.

7. The particulate accumulation amount estimating system as recited in claim 6, wherein
   the ash accumulation amount estimating section is configured to estimate the ash accumulation amount based on a vehicle travel history to obtain an estimation characteristic that is amended based on a comparison of the ash accumulation amount estimated based on the vehicle travel history of the vehicle and an ash accumulation amount estimated based on the pressure difference across the particulate filter at a time when the amount of particulate matter accumulated in the particulate filter is below a prescribed amount.

8. A particulate accumulation amount estimating system comprising:
   a pressure difference detecting section configured to detect a pressure difference across a particulate filter that is configured and arranged to capture particulate matter contained in exhaust gas discharged from an engine;

an ash accumulation amount estimating section configured to estimate an ash accumulation amount of ash accumulated in the particulate filter;

an effective area determining section configured to determine a change in an effective area of the particulate filter resulting from the ash accumulated in a particulate filter based on the estimated value of the ash accumulation amount; and a particulate accumulation amount estimating section configured to estimate a particulate accumulation amount of particulate matter accumulated in the particulate filter based on the pressure difference that was detected and the effective area change that was determined, the particulate accumulation amount estimating section being further configured to change an estimation characteristic used to estimate the particulate accumulation amount to a pressure difference increase characteristic when the particulate accumulation amount is increasing and a pressure difference decrease characteristic when the particulate accumulation amount is decreasing.

9. A particulate accumulation amount estimating system comprising:

a pressure difference detecting section configured to detect a pressure difference across a particulate filter that is configured and arranged to capture particulate matter contained in exhaust gas discharged from an engine;

an ash accumulation amount estimating section configured to estimate an ash accumulation amount of ash accumulated in the particulate filter;

an effective area determining section configured to determine a change in an effective area of the particulate filter resulting from the ash accumulated in the particulate filter based on the estimated value of the ash accumulation amount; and a particulate accumulation amount estimating section configured to estimate a particulate accumulation amount of particulate matter accumulated in the particulate filter based on the pressure difference that was detected and the effective area change that was determined, the ash accumulation amount estimating section further configured to amend the estimated value of the ash accumulation amount based on a detected frequency with which the particulate filter has been subjected to a vehicle traveling condition in which ash accumulates inside a wall of the particulate filter, the ash accumulation amount estimating section determining that the vehicle traveling condition exists when the particulate accumulation amount is below a prescribed amount and when a temperature of at least one of the particulate filter and the exhaust gas is equal to or above a prescribed temperature.

10. The particulate accumulation amount estimating system as recited in claim 9, wherein the effective area determining section is further configured to determine the change in the effective area of the particulate filter based on the frequency and the estimated value of the ash accumulation amount.

11. The particulate accumulation amount estimating system as recited in claim 10, further comprising a particulate filter regeneration section configured to determine if the particulate filter needs to be regenerated based on the estimated particulate accumulation amount of the particulate accumulation amount estimating section.

* * * * *